(No Model.)
P. A. FAVIER.
MACHINERY FOR PREPARING FIBERS OF PLANTS.
No. 266,124. Patented Oct. 17, 1882.
Fig. 1.
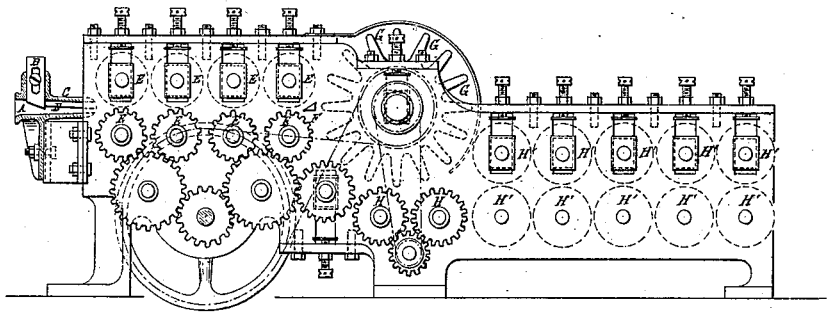
Fig. 2.
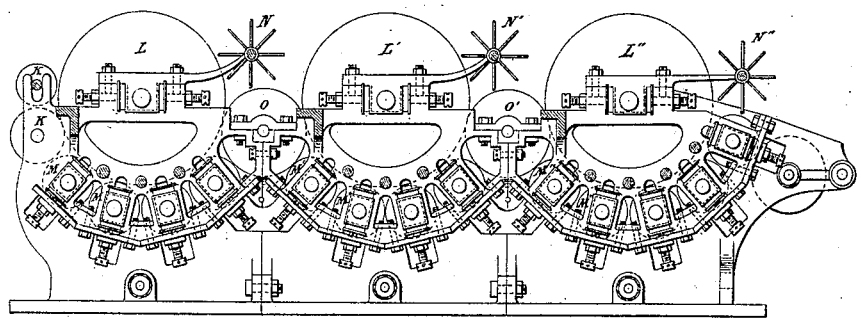
Fig. 4.   Fig. 3.
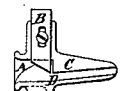 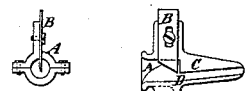
Fig. 6.   Fig. 7.   Fig. 5.
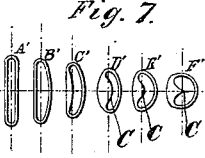 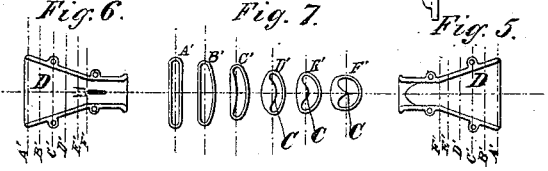 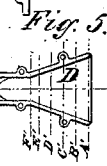
Witnesses:
P. A. Favier

UNITED STATES PATENT OFFICE.

PIERRE A. FAVIER, OF VILLEFRANCHE, FRANCE.

MACHINERY FOR PREPARING FIBERS OF PLANTS.

SPECIFICATION forming part of Letters Patent No. 266,124, dated October 17, 1882.

Application filed June 9, 1882. (No model.) Patented in Belgium June 14, 1880, No. 51,758; in France June 17, 1880, No. 137,308; in Germany August 1, 1880, No. 1,278; in Italy July 27, 1881, No. 13,201; in Spain August 9, 1881, No. 703, and in England April 26, 1882, No. 1,973.

*To all whom it may concern:*

Be it known that I, PIERRE AUGUSTE FAVIER, of Villefranche, in the Department du Rhone, in the Republic of France, have invented certain new and useful Improvements in Machinery for Preparing Fibers of Plants known as "China-Grass," "Ramee," "Rhéa," &c., of which the following is a specification, reference being had to the accompanying drawings.

My invention relates to machinery for obtaining the fibers of china-grass, &c., in two successive operations. The first operation is one of separating the bark from the woody stalks of the plant, and the second is one of extracting the fibers from this bark by means solely mechanical. To arrive at the complete result I employ a new machine, which permits the two operations to be performed without any interruption; but the organs of this machine may be mounted on different frames, with a view to perform singly the two operations, according as it is desired to treat green or dry stalks.

The advantage of employing my machine for operating upon dry material permits either the complete process of obtaining the fibers to be performed at the place of agricultural production, or of there performing only the stripping of the bark, to be carried to distant factories in bales, of which the weight relatively to the weight of the stalk would be reduced from fifty to sixty per cent. and the volume about seventy-five per cent.

The accompanying drawings represent the two organs or principal portions of my machine mounted on two different frames, in order to avoid too great reduction of scale; but it may be clearly seen that it is only necessary to place the two end to end to obtain a complete machine, of which the two portions—one a stripper and the other a rubber—may work together.

Figure 1 is a longitudinal elevation, partly in section, of that portion of the machine which performs the stripping of the bark from the stalk. Fig. 2 is a longitudinal sectional elevation of that portion of the machine which performs the rubbing of the bark to extract the fibers. Fig. 3 is an axial section, and Fig. 4 a transverse section of a throat which forms the entrance to the strippers. Figs. 5 and 6 are horizontal sections of the said throat, Fig. 5 showing the lower part, and Fig. 6 the upper part. Fig. 7 exhibits transverse sections of the channel of the throat at different parts of its length, as indicated by the corresponding lines and letters on Figs. 5, 6, and 7.

The stripping is effected by first making a longitudinal incision in the upper part of the stalk by a knife, B, placed in the upper part of the throat A. Behind this knife there is provided, within the throat, on the upper part of its interior, a prow-like divider, C, which is sharp near the knife, but gradually broadens and becomes flat, and which compels the laying open of the stalk and its spreading out as it passes through the channel D of the throat, which gradually widens like the divider C, and is contracted vertically in a backward direction, as shown in Fig. 7.

At the exit of the channel D the stalk, opened out and somewhat flattened, is seized by a series of plain cylindrical pressure-rollers, E, of which the number and diameter may be increased or diminished, and which operate to completely flatten the stalk and break up the resin contained between the fiber and the woody portion. After leaving the cylinders the stalk thus flattened or laminated is presented over a triangular bar, where it receives on its ligneous part, which is uppermost, blows of a rapidly-rotating beater, G, which completely breaks up the wood and detaches it in very small fragments. After this operation the bark is entirely divested of its wood, and in the form of a ribbon is taken by a series of plain cylindrical pressure-rollers, H H, whence it is taken by an attendant if the work is to be done in two parts, or else is delivered to the second machine of the system if the work is to be completed without interruption by the two machines arranged end to end.

At the entrance to the second part of the machine shown in Fig. 2 the bark is taken by two plain cylindrical rollers, K K, which present it to a drum, L, the periphery of which is fluted or grooved in lines parallel with its axis, and which is partly surrounded at its lower part with small cylinders M, similarly fluted or grooved, the grooves being about one-eighth of an inch wide. The bark passes between this drum L and the cylinders M.

Behind the drum L is a rotary fan, N, having for its object to counteract the effect of centrifugal force and to prevent the bark from deviating from the course necessary for it to arrive at a second drum, L', like L. The space between these two drums is occupied by a similarly-grooved cylinder, O, of a diameter a little greater than that of the small cylinders M, or it may be occupied by two cylinders of the same diameter as that of M. The bark passes then between the second drum, L', and a series of small cylinders, M', like M, and after passing the second drum, L', passes to a third similar drum, L''. Between each two drums is placed a fan and a cylinder like N and O, before described.

The several drums L L' L'' and the cylinders O O' are geared together, so that the respective portions of their grooved peripheries which face each other rotate at the same speed and in the same direction. The small cylinders M M' M'' are set in operation by the contact of the bark passing between them and the drums L L' L''.

The number of drums may be increased or diminished in proportion to their diameter. If the diameter be greater, the number may be less, and vice versa. The reduction may be made to a single cylinder.

In leaving the last drum the bark, entirely divested of its brown pellicle with which it was covered, is also partially ungummed, the fibers being separated from one another in a state of perfect parallelism and transformed into a harl suitable for combing or heckling. On the passage of the bark between the fluted drums and the small fluted cylinders the separation of the brown exterior pellicle is effected by a gentle friction produced by the resistance of the small fluted cylinders, and also by the effect of the bending of the bark in the curves which it is obliged to follow.

As has been above stated, two cylinders of the same diameter as M and grooved like them may be substituted for each cylinder O. In such case the bark will pass between these cylinders and be directed without the aid of the fans, which may thus be dispensed with.

The grooves or fluting of the several drums and cylinders may be alike in all the drums and cylinders or be of different degrees of fineness in the several drums, the fluting of the cylinders corresponding with that of their respective drums.

In order to more thoroughly ungum and separate the fibers, there may be given, by any suitable mechanical means, to each drum a slight movement—say one-fifth of an inch—in the direction of its axis.

As hereinbefore described, the two portions of the machine—viz., the stripper and the rubber—may be separated; but when intended to treat stalks in a green state they should not be separated; and both the pressure-rollers H H' and the drums L L' L'' should be made hollow and heated by steam introduced into them.

It is obvious that the throat may have its prow-like internal projection, C, and knife B inverted—that is to say, at the bottom instead of at the top—in which case the arrangement and operation of the rotary beaters would have to be reversed.

In some cases the rotary beaters G and the bar F may be dispensed with and be replaced by a series of fluted cylinders or rollers supported one above another and placed on the same horizontal lines with the cylinders or rollers E E.

The form of the edge of the knife B may be varied. Instead of being straight, as shown, it may be round.

What I claim as my invention, and desire to secure by Letters Patent, is—

1. The combination, with a throat for the reception of a stalk, of a knife entering said throat for making a longitudinal cut in the stalk, the said throat being constructed behind the knife, so as to lay the stalk open from the longitudinal cut, substantially as herein described.

2. The throat A, provided with a splitting-knife and provided behind the said knife with a prow-like internal projection, C, and being gradually contracted vertically and widened from the front of the prow, and furnished with a knife, B, all substantially as and for the purpose herein described.

3. In a machine for preparing fibers from fibrous plants, the combination of the throat A, having a knife, B, and a divider, C, the rollers E E, the bar F, and the beaters G and rollers H H', substantially as herein described.

P. A. FAVIER.

Witnesses:
LOUIS BASHEL,
H. FESCHOTTE.